United States Patent [19]

Steeper

[11] Patent Number: 4,888,979
[45] Date of Patent: Dec. 26, 1989

[54] LEAK DETECTION AID

[75] Inventor: Timothy J. Steeper, Graniteville, S.C.

[73] Assignee: The United States Department of Energy, Washington, D.C.

[21] Appl. No.: 310,556

[22] Filed: Feb. 15, 1989

[51] Int. Cl.$^4$ .............................................. G01M 3/22
[52] U.S. Cl. .......................................... 73/40.7; 73/46; 73/49.8; 277/2
[58] Field of Search .......................... 73/40.7, 46, 49.8; 277/2

[56] References Cited

U.S. PATENT DOCUMENTS

| | | | |
|---|---|---|---|
| Re. 30,311 | 6/1980 | Chaplin et al. | 73/46 |
| 3,895,735 | 7/1975 | Clay | 73/49.8 X |
| 3,949,598 | 4/1976 | Bergstrand | 73/40.7 X |
| 4,410,186 | 10/1983 | Pierce, Jr. | 73/46 X |
| 4,420,970 | 12/1983 | Organi | 73/46 |
| 4,723,441 | 2/1988 | Sweeney | 73/40.5 R |

FOREIGN PATENT DOCUMENTS

| | | | |
|---|---|---|---|
| 1275609 | 10/1961 | France | 277/2 |
| 2323295 | 4/1977 | France | 73/46 |
| 22985 | 2/1977 | Japan | 73/46 |
| 159041 | 9/1984 | Japan | 73/40.7 |
| 190390 | 7/1964 | Sweden | 277/2 |
| 854189 | 11/1960 | United Kingdom | 277/2 |

Primary Examiner—John Chapman
Assistant Examiner—Joseph W. Roskos
Attorney, Agent, or Firm—Allen F. Westerdahl

[57] ABSTRACT

A leak detection apparatus and method for detecting leaks across an O-ring sealing a flanged surface to a mating surface is an improvement in a flanged surface comprising a shallow groove following O-ring in communication with an entrance and exit port intersecting the shallow groove for injecting and withdrawing, respectively, a leak detection fluid, such as helium. A small quantity of helium injected into the entrance port will flow to the shallow groove, past the O-ring and to the exit port.

2 Claims, 1 Drawing Sheet

LEAK DETECTION AID

CONTRACT STATEMENT

The United States Government has rights in this invention pursuant to Contract No. DE-AC09-76SR00001 between the U.S. Department of Energy and E. I. DuPont de Nemours & Co.

BACKGROUND OF THE INVENTION

1. Field of the Invention

The invention relates to leak detection methods and apparatus. More specifically the invention is a method and apparatus for detecting leaks across an O-ring sealing a flanged end of a pipe, container or the like.

2. Discussion of Background and Prior Art

O-rings and gaskets are well known as sealing mechanisms between two surfaces such as the flanged ends of pipe sections, the flanged top of a container and its lid, or other mating surfaces. O-rings are usually made of a resilient substance such as rubber or plastic that deform as the two mating surfaces are brought together. A shallow groove is usually provided to hold the O-ring in place and direct its deformation.

To verify that an O-ring has formed a tight seal, various tests have been devised. Sometimes soap is spread on the outside of the piping or container at the interface of the two mating surfaces and air is pumped from within. Soap bubbles caused by escaping air betray the leaks.

For high vacuum systems, helium is used because of its mobility. Helium is sprayed on all the joints to test for leaks. Because helium moves readily through air, false positive indications are frequent as the helium finds other paths to the detector.

SUMMARY OF THE INVENTION

It is an object of the present invention to provide a method and apparatus for improving the detection of leaks across O-ring seals.

It is a further object of the present invention to provide a method and apparatus for eliminating false positive indications of leaks across O-ring seals.

It is a still further object of the present invention to provide a method and apparatus allowing an O-ring seal to be checked for leaks at any time.

To achieve the foregoing and other objects and in accordance with the purpose of the invention, as embodied and broadly described herein, the invention comprises an improvement to a flange at the end of piping section or the top of a container to be mated with another surface and which flange has an O-ring in a circumferential groove, the improvement comprising a second groove, or channel, in the surface of the flange adjacent to and following the circumference of the O-ring and an entrance port to and an exit port from the second groove. Injecting a leak detection fluid such as helium in the entrance port as the leak detection fluid is withdrawn from the exit port so that a flow of fluid is created in the second groove allows the fluid to circulate in the second circumferential groove and have access to the O-ring for leak detection. If the presence of helium is detected on the other side of the O-ring, it may be presumed that a leak in the O-ring exists.

Because the helium is directed at the O-ring by the second groove, the present invention does not miss any leaks and is much quicker than the present practice. Only a small burst of helium will serve to show a leak across the O-ring, not enough helium to affect background levels in the testing environment where other joints may also be undergoing testing, and the test can be done at any time without disturbing the seal connection.

Reference is now made in detail to the present preferred embodiment of the invention, an example of which is given in the accompanying drawings.

A BRIEF DESCRIPTION OF THE DRAWINGS

The accompanying drawings, which are incorporated in and form a part of the specification, illustrate the invention and, together with the description, serve to explain the principles of the invention. In the drawings.

DETAILED DESCRIPTION OF THE INVENTION

Various mating, relatively rigid surfaces can be sealed by an O-ring. These include sequential pipe sections, containers and lids, filter cannisters, and the like. Usually the end surface having the O-ring is flanged and a shallow circumferential groove is provided in the flange for receiving the O-ring.

Figure 1:
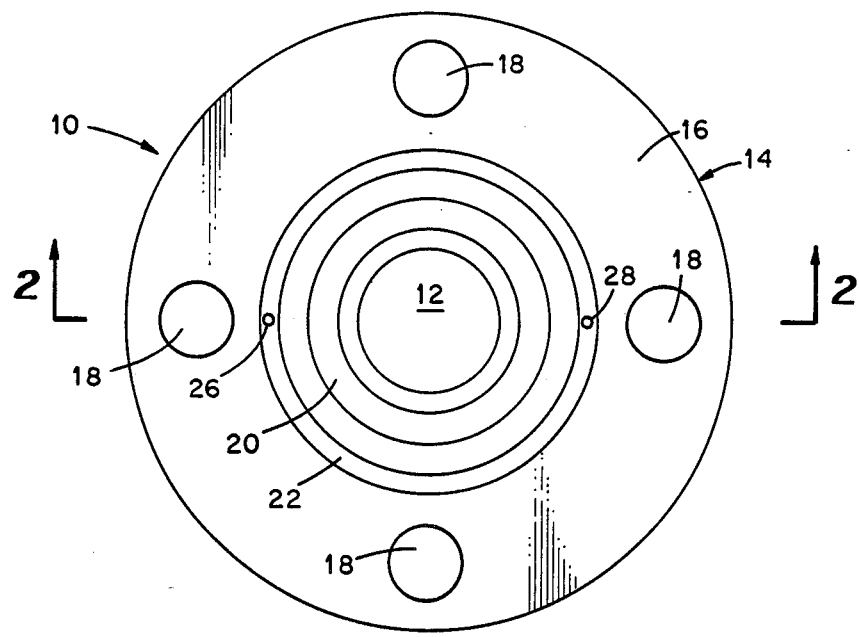
FIG. 1 shows an end plan view of a flange illustrating the second channel according to the present invention.

Referring to FIG. 1, illustrating an end view of a section of a pipe 10 defining a opening 12. At the end of pipe 10 is a flange 14. Flange 14 has a surface 16 which is to be sealed against a mating surface. Adjacent sections of piping may be joined by a plurality of circumferential bolts passing through bolt holes 18.

Positioned between bolt holes 18 and opening 12 is a first circumferential groove 20 to receive an O-ring, not shown. Adjacent first circumferential groove 20 is a second circumferential groove 22. Second circumferential groove 22 defines a channel 24 that follows the circumference of the O-ring. Two holes, 26 and 28, in flange 14 intersect second circumferential groove 22.

Figure 2:
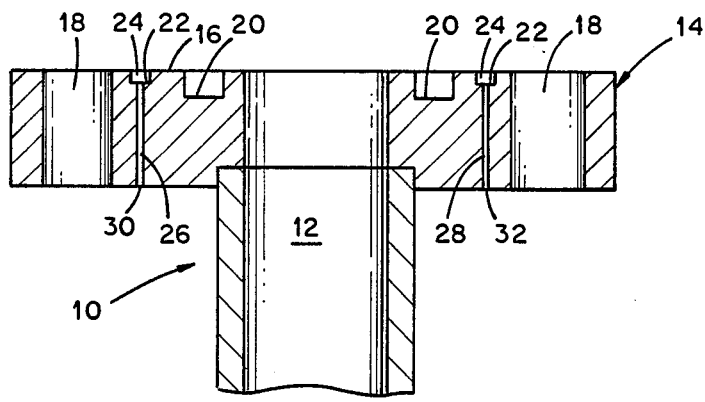
FIG. 2 shows a side cross sectional view along line 2–2 of FIG. 1 according to the present invention.

FIG. 2 shows a side cross-sectional view of the present invention. Holes 26 and 28 form the entrance and exit, respectively, to channel 24. Hole 26, channel 10 and hole 28 communicate to form a passage for a leak detection fluid to flow. A leak detection fluid, such as helium, is injected into hole 26 at location 30, flows into channel 24 and about the circumference of the O-ring, then into hole 28 where it is withdrawn at location 32. If the presence of helium is measured within opening 12, the helium is presumed to have crossed O-ring and thus a leak exists.

It will be obvious that holes 26 and 28 do not have to be formed through flange 14 but may be directed radially outward along surface 16 to the extreme periphery of flange 14 or may pass between bolt holes 18 to some other point on the exterior of flange 14.

Likewise, in some applications it may be convenient to have first circumferential groove 20 radially outward of second circumferential groove 22. In this alternate embodiment, holes 26 and 28 would communicate with opening 12 rather than the exterior of pipe 10.

The foregoing description of preferred embodiments of the invention has been presented for purposes of illustration and description. It is not intended to be exhaustive or to limit the invention to the precise form disclosed, and obviously many modifications and variations are possible in light of the above teachings. The embodiments were chosen and described in order to best explain the principles of the invention and its practical application to thereby enable one skilled in the art to best utilize the invention in various embodiments and with various modifications as are suited to the particular use contemplated. It is intended that the scope of the invention be defined by the claims appended hereto.

What is claimed is:

1. An improvement in a flange at the end of a pipe, container, and the like, said flange having an end surface and a first circumferential groove in said end surface for receiving an O-ring to seal said end surface against a mating surface, said improvement for aiding in the detection of leaks across said O-ring, wherein the improvement comprises a second circumferential groove formed in said flange outward of said O-ring to carry a leak detection fluid into and out of said flange and along the circumference of said O-ring so that said leak detection fluid can leak across said O-ring where said O-ring does not seal said end surface, but said leak detection fluid being generally confined to said channel and two passages formed through said flange intersecting said second circumferential groove in communication therewith and with the exterior of said pipe so that said leak detection fluid can be pumped into one of said passages, pass through said second circumferential groove and withdrawn from another of said passages.

2. A method for detecting leaks across an O-ring sealing an end surface of a flange at the end of a pipe, container, and the like, against a mating surface, said method comprising the steps of cutting a channel in said flange radially outward of said O-ring, said channel having an entrance to and an exit from said flange exterior to said pipe;

injecting a leak detection fluid in said entrance while withdrawing said leak detection fluid from said exit so that said leak detection fluid, carried by and generally confined to said channel, flows past said O-ring;

measuring for the presence of said leak detection fluid at a point radially inward of said O-ring.

* * * * *